United States Patent Office 2,857,419
Patented Oct. 21, 1958

2,857,419

NEW POLYGLYCOL ESTERS OF N-ALKYL-4-AMINOSALICYLIC ACID

Max Matter, Worb, and Albert Kobler and Max Kuhn, Guemligen, Switzerland, assignors to Ciba Pharmaceutical Products Inc., Summit, N. J.

No Drawing. Application August 28, 1956
Serial No. 606,544

Claims priority, application Switzerland
September 2, 1955

3 Claims. (Cl. 260—471)

This invention relates to new polyglycol esters, and more patricularly to the esters of the general formula

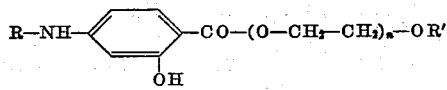

in which R indicates an alkyl radical with 4 or 5 carbon atoms, R' indicates hydrogen or the methyl radical, and $n$ stands for a whole number from 7–15 inclusive, and processes for their preparations.

The new esters exhibit valuable pharmacological properties. Thus they possess a pronounced local anaesthetic effect; in particular they have a selective action on the dilatation receptors of the lungs. They can be used as medicaments, especially as cough remedies. The new compounds of the invention possess considerable advantages compared with corresponding compounds in which $n$ indicates lower or higher numbers than those specified above.

The new esters are prepared by treating a benzoic acid methyl ester of the general formula

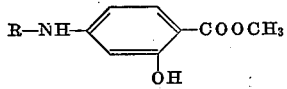

with a polyglycol of the general formula $$HO—(CH_2—CH_2—O)_n—R'$$

wherein R, R' and $n$ have the meanings given above in the presence of a basic condensing agent such as sodium methylate.

In a specific embodiment of the invention p-n-butyl-amino-salicylic acid methyl ester is heated with nona-ethyleneglycol monomethyl ether in the presence of a sodium methanolate solution in anhydrous methanol, anhydrous toluene being added and distilled off during the heating period. The reaction mixture is taken up in benzene which is washed with aqueous sodium carbonate solution and water. On evaporation of the benzene solution, the p-n-butylaminosalicylic acid ester of nona-ethyleneglycol monomethyl ether is obtained.

The new esters can also be prepared by carrying out the above transesterification with a benzoic acid methyl ester of the formula

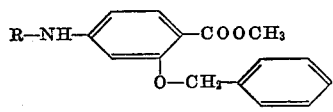

wherein R has the above given meaning and hydrogenatively splitting off the benzyl radical of the polyglycol ester formed using palladium carbon in methanol as hydrogenation catalyst.

It is noteworthy that the new esters as a rule possess an appreciable solubility in water. The solutions produced possess the characteristic that on heating they become turbid at a definite temperature which depends upon the concentration. This characteristic temperature, in the case of a 10% solution, is designated as the turbidity point (cloud point) and constitutes a physical constant for the compound concerned. The turbidity formation is reversible; on cooling, the solution becomes clear again.

Those compounds specified as starting materials which are new can be prepared by customary methods.

The following examples illustrate the invention.

Example 1

2.23 grams of p-n-butylaminosalicylic acid methyl ester are treated with 8.6 grams of nona-ethyleneglycol monomethyl ether and 0.15 cc. of 30% sodium methanolate solution in anhydrous methanol and then heated for 4 hours with exclusion of moisture in a bath at 190–200° C. At the same time 150 cc. of anhydrous toluene are uniformly run in below the liquid surface at such a rate that it distills off at 130–135° C. and the vapours are passed through an empty intermediate column and condensed in a descending condenser.

After allowing to cool, the reaction mixture is taken up in 100 cc. of benzene and shaken consecutively twice in each case with 20 cc. of 10% aqueous sodium carbonate solution and 20 cc. of water. The aqueous layers are again washed consecutively twice with 100 cc. of benzene each time and then after combining them they are extracted three times with 100 cc. of chloroform in each case. By evaporation of the chloroform extracts 4.5 grams of nona-ethyleneglycol monomethyl ether can be regenerated, while the dried benzene extracts, on evaporation under reduced pressure yield 6.3 grams of a brownish viscous oil which contains the p-n-butylaminosalicylic acid ester of nona-ethyleneglycol monomethyl ether of the formula

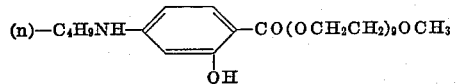

Its purification can be carried out, for example, by chromatography over neutral alumina using carbon tetrachloride, benzene, methylene chloride and chloroform as solvents. The pure ester is thus obtained in the form of a colourless oil which is easily soluble in water. From a 10% aqueous solution, on heating above 42° C., it separates as a milky turbidity.

Example 2

3.28 grams of ortho-benzyloxy-para-(n)-pentylamino benzoic acid methyl ester melting at 92–93° C. are transesterified with 17.5 grams of hepta-ethylene-glycol in the presence of 0.2 cc. of absolute methanolic sodium methylate solution of 25% strength for 2 hours by heating in a bath at 110° C. under the water jet vacuum with the exclusion of moisture, while passing 130 cc. of anhydrous xylene through. On working up in the way described in Example 1, there are obtained 5.9 grams of a viscous, nearly colourless oil which consists or ortho-benzyloxy-para-(n)-pentylamino benzoic acid monoester of hepta-ethylene glycol of the formula

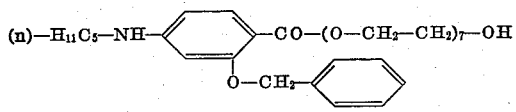

For the purpose of purification, the crude product in ether is allowed to run through a column of 200 grams of aluminium oxide, slight quantities of impurities being eluated. Further portions of by-products can be eluated with methylene chloride. The monoester is obtained by eluation with chloroform. By agitating a solution of the monoester in 50 cc. of methanol in the presence of 1.5 grams of palladium carbon of 5% strength and in an atmosphere of hydrogen, the benzyl group is removed by hydrogenation in the course of a few minutes with a consumption of hydrogen corresponding to the theoretical amount.

After suction-filtering the catalyst and washing the residue with methanol, there is obtained on evaporating the filtrate under reduced pressure a viscous residue which can be purified by chromatography over aluminium oxide. There is obtained an almost colourless, viscous oil which is the monoester of para-(n)-pentylaminosalicylic acid with heptaethylene glycol of the formula

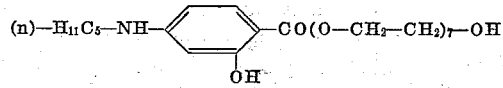

It is easily soluble in cold water and some of the usual organic solvents and, from a 10% aqueous solution, on heating above 33° C., it separates as a milky turbidity.

The ortho-benzyloxy-para-(n)pentylamino benzoic acid methyl ester used as intermediate product in this example can be prepared as follows:

First ortho-benzyloxy-para-amino benzoic acid methyl ester of melting point 128–129° C. is prepared for example according to the process known for the ethyl ester (cf. Journal of the American Chemical Society, 73, 3679 [1951]). 27.1 grams thereof are stirred into 180 cc. of benzene and mixed with 26 grams of zinc dust and 24 cc. of glacial acetic acid. 12 grams of N-valeraldehyde are added dropwise in the course of about 30 minutes at boiling temperature with brisk stirring. After an hour at boiling temperature, the mixture is filtered hot from the insoluble portions and the residue is well washed with a mixture of benzene and glacial acetic acid (10:1). The combined filtrates are extracted twice with water and then with saturated sodium bicarbonate solution until the benzene solution is free from acid. The solution is evaporated and on recrystallizing the residue from a mixture of benzene and benzine (1:4) and from methanol, the new ester is obtained in the form of colourless, flat rhombohedrons melting at 92–93° C.

What is claimed is:

1. Polyglycol esters of the formula

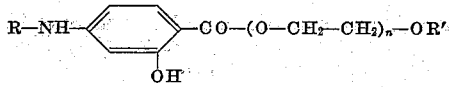

in which R represents an alkyl radical with 4–5 carbon atoms, R' stands for a member selected from the group consisting of hydrogen and methyl, and $n$ represents a whole number from 7–15 inclusive.

2. The polyglycol ester of the formula

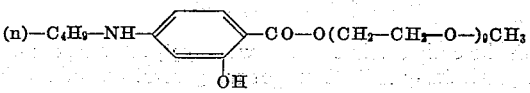

3. The polyglycol ester of the formula

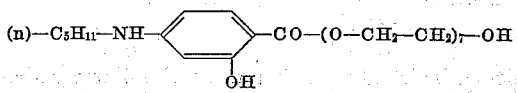

References Cited in the file of this patent

UNITED STATES PATENTS

| | | |
|---|---|---|
| 1,889,645 | Eisleb | Nov. 29, 1932 |
| 2,662,889 | Clinton et al. | Dec. 15, 1953 |
| 2,714,607 | Matter | Aug. 2, 1955 |

OTHER REFERENCES

Merck Index, 1952, pp. 199, 336, 789.